(12) United States Patent
Winter

(10) Patent No.: US 10,907,664 B2
(45) Date of Patent: Feb. 2, 2021

(54) SELF-CLEANING MECHANISM FOR PNEUMATIC CENTRAL CLUTCH RELEASE

(71) Applicant: KNORR-BREMSE Systeme fuer Nutzfahrzeuge GmbH, Munich (DE)

(72) Inventor: Simon Winter, Munich (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 0 days.

(21) Appl. No.: 16/297,347

(22) Filed: Mar. 8, 2019

(65) Prior Publication Data
US 2019/0203745 A1    Jul. 4, 2019

Related U.S. Application Data

(63) Continuation of application No. PCT/EP2017/071142, filed on Aug. 22, 2017.

(30) Foreign Application Priority Data

Sep. 12, 2016 (DE) .......................... 10 2016 117 091

(51) Int. Cl.
*F15B 21/041* (2019.01)
*F16D 25/08* (2006.01)
(Continued)

(52) U.S. Cl.
CPC .......... *F15B 21/041* (2013.01); *F15B 15/149* (2013.01); *F15B 21/005* (2013.01); *F16D 25/083* (2013.01)

(58) Field of Classification Search
CPC .... F15B 21/041; F15B 21/005; F15B 15/149; F16D 25/083; F16D 25/087
See application file for complete search history.

(56) References Cited

U.S. PATENT DOCUMENTS

| | | | | |
|---|---|---|---|---|
| 5,577,585 A | * | 11/1996 | Corral | F16D 25/085 |
| | | | | 192/85.52 |
| 5,743,370 A | * | 4/1998 | Thomire | F16D 25/083 |
| | | | | 192/85.51 |

(Continued)

FOREIGN PATENT DOCUMENTS

| CN | 201810693 U | 4/2011 |
|---|---|---|
| CN | 202228568 U | 5/2012 |

(Continued)

OTHER PUBLICATIONS

Pohl, Wolfgang. Machine Translation of EP0775619. May 28, 1997. Espacenet. (Year: 1997).*

(Continued)

*Primary Examiner* — Charles A Fox
*Assistant Examiner* — Lori Wu
(74) *Attorney, Agent, or Firm* — Crowell & Moring LLP

(57) ABSTRACT

A self-cleaning mechanism for a pneumatic central clutch release includes: a release piston which is coaxially arranged around a hollow shaft and is mounted such that it moves in the direction of an axis of the hollow shaft; and a housing which at least partially surrounds the release piston so as to form a pressure chamber between the hollow shaft, the housing and the release piston, which is sealed from the environment and can be connected to a fluid pressure source; and a cleaning chamber fluidically arranged between the pressure chamber and the environment. The cleaning chamber is able to be connected to the environment by way of a ventilation channel.

15 Claims, 3 Drawing Sheets

(51) Int. Cl.
  *F15B 15/14* (2006.01)
  *F15B 21/00* (2006.01)

(56) References Cited

U.S. PATENT DOCUMENTS

| | | | | |
|---|---|---|---|---|
| 5,779,019 | A * | 7/1998 | Grosspietsch | F16L 37/144 |
| | | | | 192/85.59 |
| 6,167,995 | B1 * | 1/2001 | Lindner | F16D 25/083 |
| | | | | 192/3.57 |
| 2012/0145511 | A1 * | 6/2012 | Wilton | F16D 25/0638 |
| | | | | 192/85.17 |
| 2013/0001037 | A1 | 1/2013 | Borchers et al. | |
| 2015/0233429 | A1 | 8/2015 | Bosnjak | |

FOREIGN PATENT DOCUMENTS

| | | |
|---|---|---|
| CN | 102918292 A | 2/2013 |
| DE | 21 15 443 A | 11/1971 |
| DE | 199 11 035 A1 | 9/2000 |
| DE | 102 53 023 A1 | 5/2004 |
| DE | 10 2010 021 806 | 12/2011 |
| DE | 10 2011 078 125 A1 | 12/2012 |
| DE | 10 2013 215 740 A1 | 2/2014 |
| EP | 0 775 619 A2 | 5/1997 |
| EP | 0 775 619 B1 | 7/1999 |
| EP | 1344949 A2 * | 9/2003 ........... F16K 15/183 |
| GB | 1 323 794 | 7/1973 |
| GB | 2 347 722 | 9/2000 |

OTHER PUBLICATIONS

Chinese-language Office Action issued in counterpart Chinese Application No. 201780055977.5 dated Nov. 4, 2019 with English translation (12 pages).
International Search Report (PCT/ISA/210) issued in PCT Application No. PCT/EP2017/071142 dated Dec. 15, 2017 with English translation (four (4)pages).
German-language Written Opinion (PCT/ISA/237) issued in PCT Application No. PCT/EP2017/071142 dated Dec. 15, 2017 (five (5) pages).
German-language Search Report issued in counterpart German Application No. 10 2016 117 091.7 dated Jul. 5, 2017 (five (5) pages).
International Preliminary Report on Patentability (PCT/IB/326 & PCT/IB/373) issued in PCT Application No. PCT/EP2017/071142 dated Mar. 21, 2019, including English translation of document C2 (German-language Written Opinion (PCT/ISA/237 previously filed on Mar. 8, 2019)) (eight (8) pages).

* cited by examiner

ND SUMMARY OF THE INVENTION

SELF-CLEANING MECHANISM FOR PNEUMATIC CENTRAL CLUTCH RELEASE

CROSS REFERENCE TO RELATED APPLICATIONS

This application is a continuation of PCT International Application No. PCT/EP2017/071142, filed Aug. 22, 2017, which claims priority under 35 U.S.C. § 119 from German Patent Application No. 10 2016 117 091.7, filed Sep. 12, 2016, the entire disclosures of which are herein expressly incorporated by reference.

BACKGROUND AND SUMMARY OF THE INVENTION

The present invention concerns a self-cleaning mechanism for a pneumatic central clutch release.

Usually, a clutch is arranged between the engine and gearbox of a motor vehicle so as to create or separate the force flow connection between the engine and gearbox as required, for example in order to change a gear ratio (gear). If the clutch is actuated pneumatically, according to the prior art, a pneumatic central clutch release is provided inside a vehicle clutch bellhousing arranged between the engine and the gearbox.

A pneumatic clutch release according to the prior art is known for example from DE 10 2011 078 125 A1 and is explained below with reference FIG. 3 herein. The central clutch release has a hollow shaft 14 for mounting a release piston 16 which is movable in the direction of axis A of the hollow shaft 14. Furthermore, the central clutch release has a housing 15 which at least partially surrounds the release piston 16, so as to form a pressure chamber 31 between the hollow shaft 14, the housing 15 and the release piston 16, which chamber is sealed against the environment and can be connected to a compressed air source. If the pressure chamber 31 is loaded with compressed air, the release piston 16 moves to the left in FIG. 3. The pressure chamber 31 is sealed against the surrounding atmosphere by way of pneumatic seals 23*a* and 23*i*. Furthermore, dust seals 21*a* and 21*i* protect against the ingress of particles.

A clutch (not shown in FIG. 3) is arranged coaxially and adjacent to the central clutch release (on the left next to the central clutch release in FIG. 3), and is directly actuated by the central clutch release. The clutch produces dust-like clutch abrasion. This clutch dust, because of its abrasive effect, is harmful to the plain bearing 22*i* and the pneumatic seals 23*a*, 23*i* of the central clutch release. Contamination such as clutch dust which has penetrated into the plain bearings 22*i* or the pneumatic seals 23*a*, 23*i* increases the wear and consequently shortens their service life.

The central clutch release according to the prior art, as shown in FIG. 3, is protected from the penetration of clutch dust in the radially outer region 200 solely by a dust seal 21*a*. Dust seals however do not offer complete protection against penetration of clutch dust. Clutch dust which enters the central clutch release via the radially outer region 200, past the dust seal 21*a*, also penetrates past a radially outer pneumatic seal 23*a* and through the pressure chamber 31 to the radially inner plain bearings 22*i* and a radially inner pneumatic seal 23*i*. All these elements are attacked by the clutch dust.

It is an object of the invention to provide a structure by which a penetration of clutch dust into a pneumatic central clutch release is minimized in order to extend the service life of bearings and seals inside the central clutch release.

According to the invention, the radially outer plain bearings and pneumatic seals of the central clutch release are protected from clutch dust, and other contaminants from the environment, not via dust seals but by the provision of a cleaning chamber in which the components to be protected are arranged. According to the invention, the components to be protected are arranged inside the cleaning chamber, wherein the fluid pressure inside the cleaning chamber is at least for part of the time higher than the ambient pressure, but in any case at least equal to ambient pressure. This prevents contaminants such as clutch dust from penetrating into the cleaning chamber.

On movement of the release piston, i.e. on engagement and release of the piston, the fluid pressure inside the cleaning chamber is increased. The positive pressure inside the cleaning chamber is thus increased relative to the environment, and a protective atmosphere is formed inside the cleaning chamber. If contaminants have already penetrated or are penetrating into the cleaning chamber, these are pressed outward again by the positive pressure.

As a result, a latent positive pressure constantly prevails in the cleaning chamber compared with the surrounding atmosphere, and thereby a latent transport of contaminants takes place away from the cleaning chamber into the surrounding atmosphere due to the outflow of air from the cleaning chamber into the surrounding atmosphere.

In general: (fluid pressure in the pressure chamber)≥(fluid pressure in the cleaning chamber)≥(fluid pressure in the surrounding atmosphere).

One advantage of the design according to the invention is that either the service life of the pneumatic seals and plain bearings can be extended, or these may be designed for lower loads and may therefore be produced more favorably.

According to an advantageous embodiment, the cleaning chamber is connected to the surrounding atmosphere by way of a purge channel with sufficiently small channel cross-section so that fluid may escape from the cleaning chamber into the environment, but the fluid pressure inside the cleaning chamber remains above the fluid pressure of the environment for a long period. Preferably, the quantity of gas escaping through the purge channel into the environment is sufficiently low to ensure that the positive pressure in the cleaning chamber is sustained until the next movement of the release piston. According to a preferred embodiment, the cross-section of the purge channel is adapted such that this condition is fulfilled for an average movement characteristic of the release piston.

According to a preferred embodiment, a purge channel is filled with a flow diffuser, such as for example a filter, in order to establish the through-flowing gas quantity and also to help prevent the penetration of particles into the cleaning chamber.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
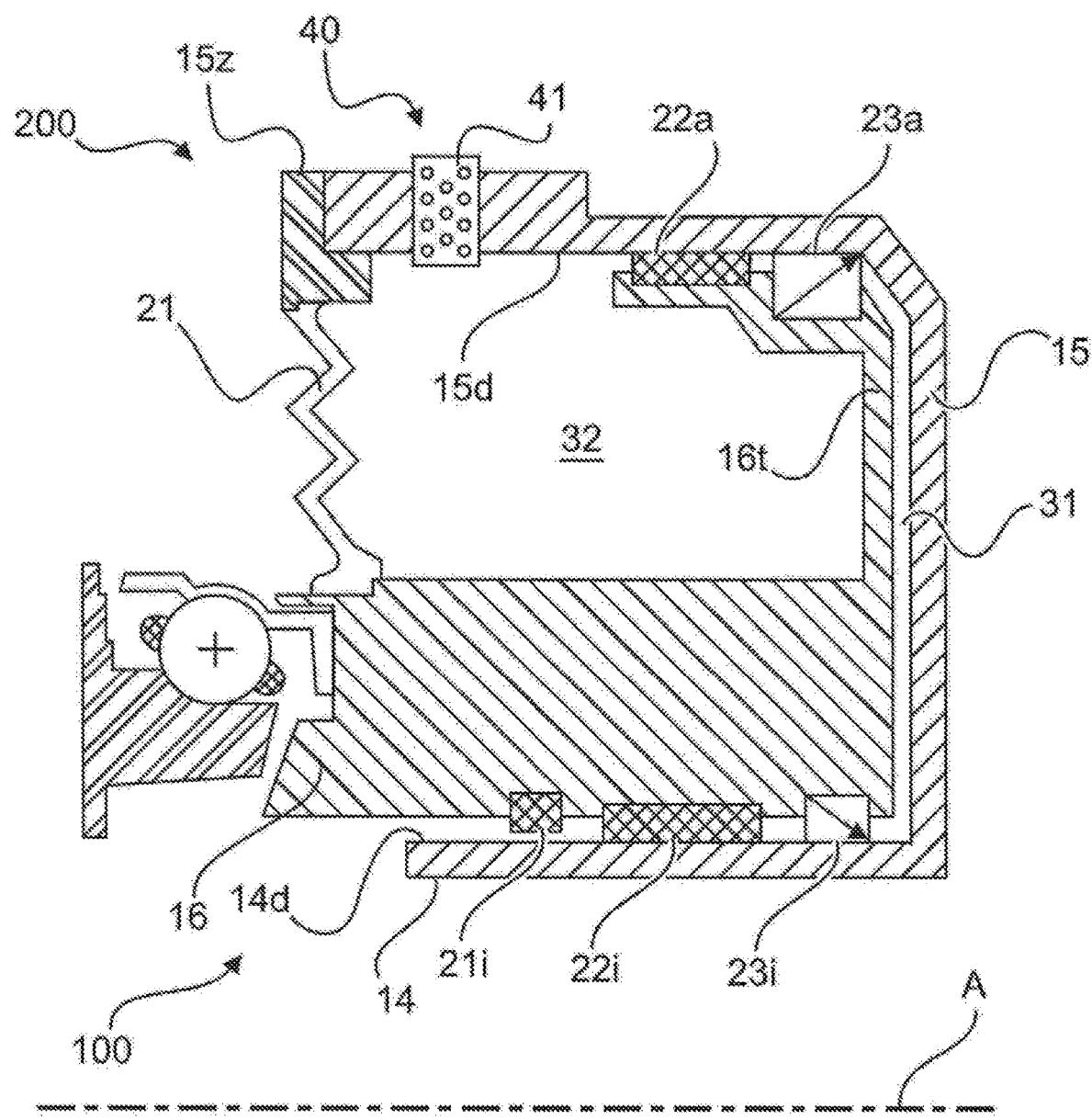
FIG. 1 shows, in a cross-sectional view, an exemplary embodiment of a central clutch release designed according to the invention.

The central clutch release shown in FIG. 1 is arranged coaxially to a hollow shaft 14 with an axis of symmetry A. Part of a housing 15 extends radially outwardly in the manner of a disc from the right-hand end of the hollow shaft 14 in FIG. 1. Adjoining this flank, a radially outer cylindrical part of the housing extends in the (opposite) direction of axis A, parallel to the hollow shaft 14, so as to form in cross-section a U-shape. A chamber, which will be described in more detail below, is formed between the radially outer cylindrical part of the housing 15, the disc-like part of the housing 15 and the hollow shaft 14, in cooperation with a flexible seal 21 to be described in more detail later (here in the form of a bellows seal). The hollow shaft 14 and the housing 15 are configured integrally in this exemplary embodiment.

Furthermore, the chamber between the radially outer cylindrical part of the housing 15 and the hollow shaft 14 also contains a release piston 16. This release piston 16 can be moved to the left and right in the direction of axis A. In the position shown in FIG. 1, the release piston 16 is at its right-hand end position in which the release piston 16 is retracted maximally into the housing 15 (engaged). The release piston 16 may be moved to the left in the direction of axis A in order to be released from the housing 15. The housing 15, the hollow shaft 14 and the release piston 16 form a pressure chamber 31. This pressure chamber 31 is sealed by a radially inner pneumatic seal 23$i$ and by a radially outer pneumatic seal 23$a$. The radially inner pneumatic seal 23$i$ seals onto a sealing face 14$d$ of the hollow shaft, wherein the radially outer pneumatic seal 23$a$ seals onto a sealing face 15$d$ of the housing.

The release piston 16 is mounted so as to be axially displaceable along axis A inside the housing 15 by a radially inner plain bearing 22$i$ and a radially outer plain bearing 22$a$. The radially inner plain bearing 22$i$ is arranged between the hollow shaft 14 and the release piston 16. The radially outer plain bearing 22$a$ is arranged between the cylindrical part of the housing 15 and the release piston 16.

The chamber enclosed by the housing 15 and the hollow shaft 14, in which the release piston 16 is displaceably arranged, is divided and separated by a partition 16$t$ of the release piston 16 into the pressure chamber 31, on the right-hand side of the partition 16$t$ viewed according to FIG. 1, and a cleaning chamber 32 on the left-hand side of the partition 16$t$.

The radially outer pneumatic seal 23$a$ seals the pressure chamber 31 against the cleaning chamber 32. The cleaning chamber 32 extends between the release piston 16, the radially outer cylindrical part of the housing 15 and the flexible seal 21 which seals between the housing 15 and the release piston 16. The housing 15 has a substantially annular intermediate piece 15$z$ which is arranged between the flexible seal 21 and the actual housing 15.

The pressure chamber 31 can be fluidically connected to at least one valve V2 (see FIG. 2) which is provided in the pressure chamber 31 in order to introduce compressed air from a fluid pressure source, which in this embodiment is indicated as a compressed air source 60. Whenever compressed air is introduced into the pressure chamber 31, the release piston 16 moves towards the left for release (viewed according to FIG. 1). This increases the volume of the pressure chamber 31, wherein the volume of the cleaning chamber 32 is reduced, as will be described in more detail below. When the release piston 16 releases to the left, the radially inner part of the flexible seal 21 moves to the left together with the release piston while the radially outer part of the seal 21 continues to rest on the housing 15, more precisely on the intermediate piece 15$z$. The housing 15 including the intermediate piece 15$z$ thus remains in its original position, without moving to the left with the release piston 16. Consequently, the flexible seal is stretched and tilted on release of the release piston 16. When the release piston 16 is in a released position at the left, the radially inner part of the flexible seal 21 is in a position shifted to the left, while the radially outer part of the flexible seal 21 has not moved. The flexible seal 21 here has a conical cross-sectional form and maintains the seal between the release piston 16 and the housing 15.

On release of the release piston 16 (leftward movement), the volume of the cleaning chamber 32 is reduced by the leftward movement of the partition 16$t$. At the same time, the volume of the cleaning chamber 32 is increased by the leftward movement of the radially inner part of the flexible seal 21. This increase is however smaller than the reduction. In total therefore, on release of the release piston 16 (leftward movement), the overall volume of the cleaning chamber 32 is reduced.

Figure 2:
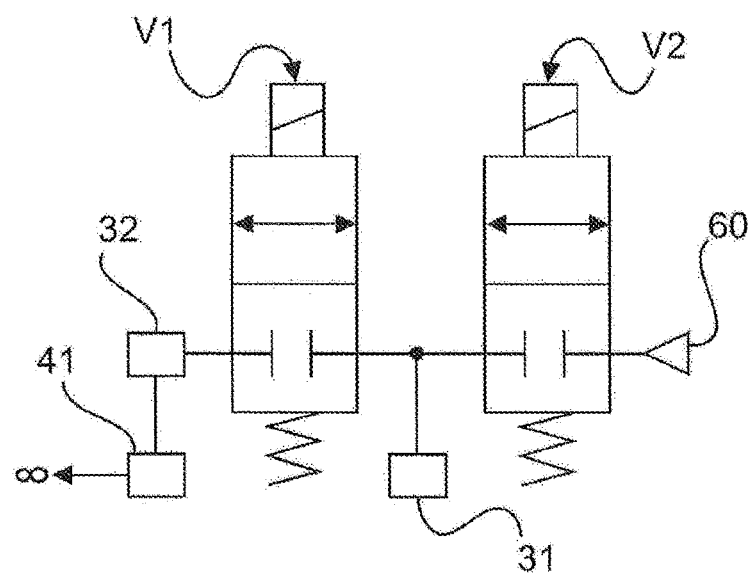
FIG. 2 shows an exemplary pneumatic connection diagram of the exemplary embodiment in FIG. 1.
Figure 3:
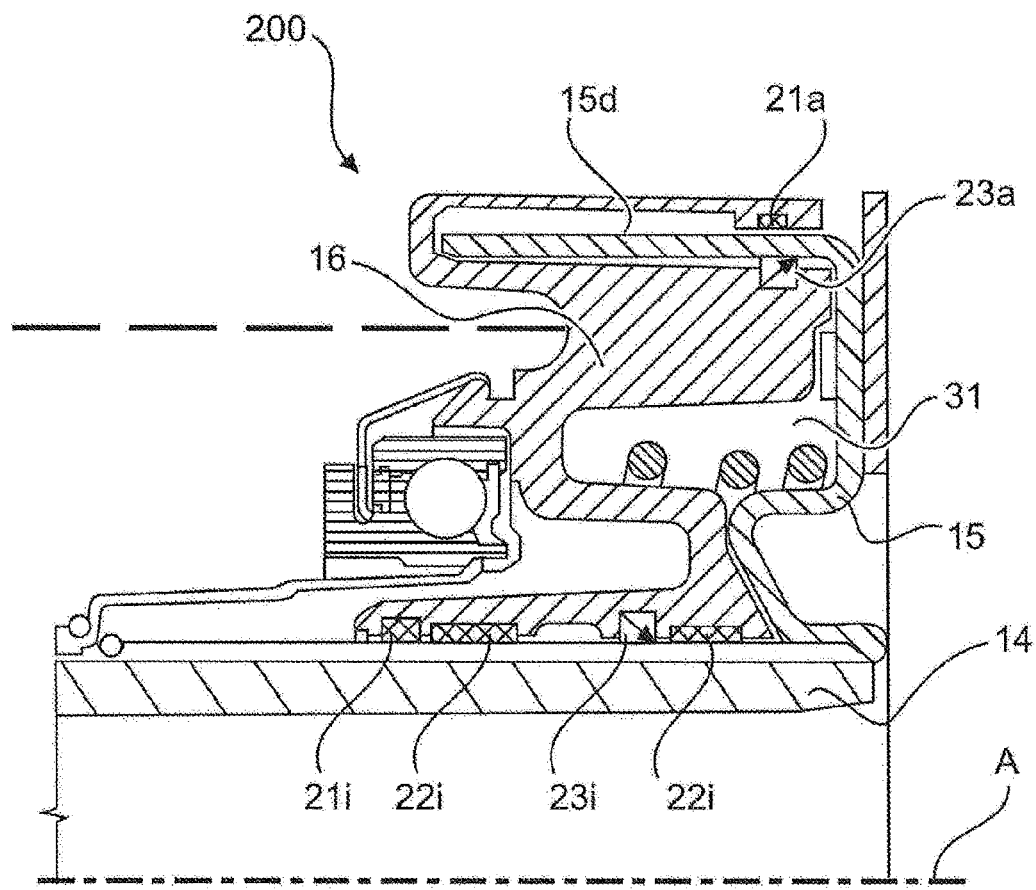
FIG. 3 shows, in a cross-sectional view, a central clutch release according to the prior art.

Furthermore, the pressure chamber 31 can be fluidically connected to the cleaning chamber 32 via at least one valve V1 (see FIG. 2). To engage the release piston 16, the valve V1 is opened, whereby compressed air is conducted from the pressure chamber 31 into the cleaning chamber 32. The pressure chamber 31 is thereby vented and the release piston 16 engages and moves to the right.

Consequently, the gas pressure inside the cleaning chamber 32 is increased both on engagement of the piston 16 (rightward movement), due to the transfer of compressed air from the pressure chamber 31 into the cleaning chamber 32, and on release of the piston 16 (leftward movement), due to the volume reduction of the cleaning chamber 32.

The housing 15 has a purge channel 40 at a point which is always part of the cleaning chamber 32 and never part of the pressure chamber 31. This purge channel 40 fluidically connects the cleaning chamber 32 with the environment so that a gas volume inside the cleaning chamber 32, which is under a higher pressure than the ambient pressure, can escape from the cleaning chamber 32 into the environment. In the present exemplary embodiment, a filter 41 is arranged inside the purge channel and allows the throughflow of gas but retains particles such as, for example, clutch dust.

The gas pressure inside the pressure chamber 31 is always greater than (or equal to) the gas pressure inside the cleaning chamber 32. Furthermore, the gas pressure inside the cleaning chamber 32 is always greater than (or equal to) the gas pressure in the environment.

Large quantities of clutch dust occur in the radially outer region 200 of the central clutch release, whereas the radially inner region 100 of the central clutch release is less exposed to clutch dust.

In this embodiment, compressed air is used as a pressurized fluid. However, the use of any arbitrary compressible fluids (gases) is also contemplated.

FIG. 2 shows the pneumatic connection diagram of the exemplary embodiment in FIG. 1. The compressed air source 60 can be fluidically connected to the pressure chamber 31 via the valve V2. The pressure chamber 31 can be fluidically connected to the cleaning chamber 32 via the valve V1. The cleaning chamber 32 is furthermore fluidically connected to the environment via the purge channel 40 or filter 41.

A self-cleaning mechanism for a pneumatic central clutch release includes: a hollow shaft 14 for mounting a release piston 16 which can be moved in the direction of axis A of the hollow shaft 14; a housing 15 which at least partially surrounds the release piston 16 so as to form a pressure chamber 31 between the hollow shaft 14, housing 15 and release piston 16, which chamber seals against the environment and can be connected to a fluid pressure source 60; a cleaning chamber 32 is fluidically arranged between the pressure chamber 31 and the environment and can be connected to the environment via a purge channel 40, wherein the pressure chamber 31 and cleaning chamber 32 can be fluidically connected together via a first valve V1.

Figure 4:
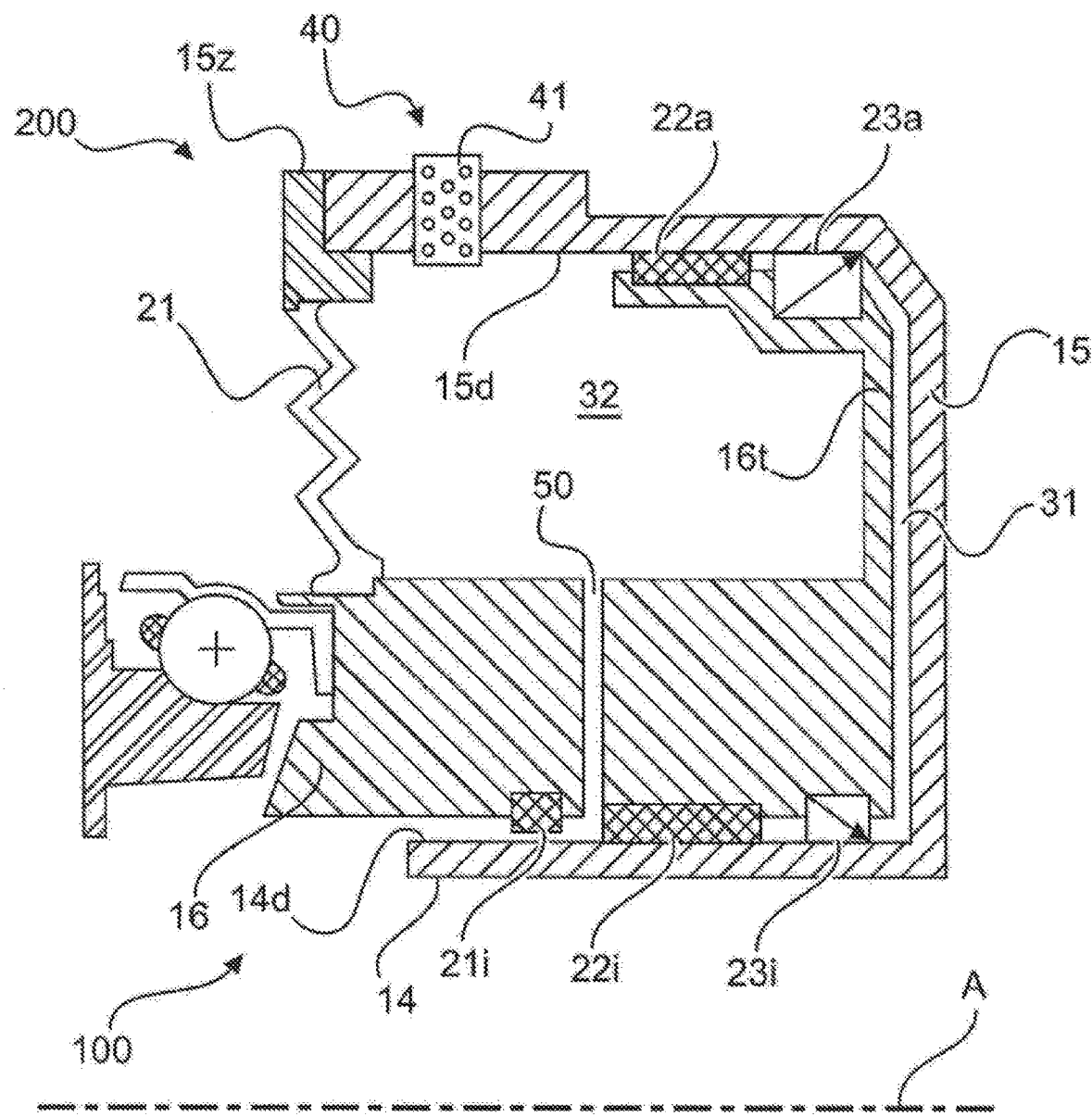
FIG. 4 shows, in a cross-sectional view, a further exemplary embodiment of a central clutch release designed according to the invention.

The central clutch release shown in FIG. 4 has all the features of the central clutch release shown in FIG. 1. In addition to the central clutch release shown in FIG. 1, however, a further purge channel 50 is provided which runs radially inward from the cleaning chamber 32 through the release piston 16. The purge channel 50 in this embodiment is designed as a bore. The purge channel 50 opens into the intermediate space between the release piston 16 and the hollow cylinder 14. This intermediate space also contains— as in the central clutch release shown in FIG. 1—the radially inner dust seal 21i, the radially inner plain bearing 22i, and the radially inner pneumatic seal 23i. The purge channel 50, like the purge channel 40, is provided to allow pressurized fluid present in the cleaning chamber 32 to escape into the environment through the purge channel 50, past the radially inner dust seal 21i. Thus, in the depiction of FIG. 4, a higher fluid pressure prevails directly to the right of the radially inner dust seal 21i than directly to the left thereof. This prevents the penetration of clutch dust through the radially inner region 100, in particular past the radially inner dust seal 21i, to the radially inner plain bearing 22i and to the radially inner pneumatic seal 23i. As shown in FIG. 4, the purge channel 50 may open into the space between the dust seal 21i and the plain bearing 22i; alternatively, it may open into the space between the pneumatic seal 23i and the plain bearing 22i (not shown). Furthermore, the purge channel 50 may be provided as an alternative to the purge channel 40.

With regard to the illustrations in FIG. 1 and FIG. 4, for clarification it is stated that on release (leftward movement) of the release piston 16, the radially outer plain bearing 22a never moves over the purge channel 40 and the radially inner dust seal 21i always remains in contact with the sealing face of the hollow shaft 14d.

LIST OF REFERENCE SIGNS

14 Hollow shaft
14d Sealing face of hollow shaft
15 Housing
15d Sealing face of housing
16 Release piston
16t Partition
21 Seal
21i Dust seal, radially inner
21a Dust seal, radially outer
22i Plain bearing, radially inner
22a Plain bearing, radially outer
23i Pneumatic seal, radially inner
23a Pneumatic seal, radially outer
31 Pressure chamber
32 Cleaning chamber
40 Purge channel
41 Filter
50 Purge channel
60 Fluid pressure source (compressed air source)
100 Radially inner region of central clutch release
200 Radially outer region of central clutch release
A Axis of symmetry of hollow shaft
V1 First valve
V2 Second valve The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A self-cleaning mechanism for a pneumatic central clutch release, comprising:
   a release piston which is coaxially arranged around a hollow shaft and is mounted so as to be movable in the direction of an axis of the hollow shaft;
   a housing which at least partially surrounds the release piston so as to form a pressure chamber between the hollow shaft, the housing, and the release piston, wherein the pressure chamber is sealed from an environment and is connectable to a fluid pressure source; and
   a cleaning chamber which is fluidically arranged between the pressure chamber and the environment and is connectable to the environment via a purge channel, wherein
      a cross-section of the purge channel is configured such that a fluid present inside the cleaning chamber and under positive pressure relative to the environment diffuses into the environment.

2. The self-cleaning mechanism as claimed in claim 1, wherein
   a first valve fluidically connects the pressure chamber and the cleaning chamber.

3. The self-cleaning mechanism as claimed in claim 2, wherein
   the first valve is a magnetic valve.

4. The self-cleaning mechanism as claimed in claim 2, wherein
   the pressure chamber and the cleaning chamber are arranged relative to each other such that, on a volume reduction of the pressure chamber, a displaced gas volume is conducted from the pressure chamber via the first valve into the cleaning chamber.

5. The self-cleaning mechanism as claimed in claim 1, wherein
   a bearing for mounting the release piston and a pneumatic seal for sealing the pressure chamber are provided between the cleaning chamber and the housing.

6. The self-cleaning mechanism as claimed in claim 1, wherein
   the pressure chamber and the cleaning chamber are arranged relative to each other in order to be actively connected together so that a volume increase of the pressure chamber causes a volume reduction of the cleaning chamber.

7. The self-cleaning mechanism as claimed in claim 1, wherein
   a flow diffuser is fluidically arranged between the cleaning chamber and the environment.

8. The self-cleaning mechanism as claimed in claim 7, wherein
the flow diffuser is a filter which is arranged in the purge channel.

9. The self-cleaning mechanism as claimed in claim 1, wherein
the purge channel is fluidically arranged between the cleaning chamber and a radially exterior environment, and
the purge channel is configured to allow fluid present inside the cleaning chamber and under a positive pressure relative to the environment to escape into the environment.

10. The self-cleaning mechanism as claimed in claim 1, wherein
another purge channel is fluidically arranged between the cleaning chamber and a radially interior environment, and
the another purge channel is configured to allow fluid present inside the cleaning chamber and under a positive pressure relative to the environment to escape into the environment.

11. The self-cleaning mechanism as claimed in claim 1, wherein the fluid pressure inside the cleaning chamber remains above the fluid pressure of the environment for a minimum period of time from a respective first movement until a respective next movement of the release piston.

12. A self-cleaning method for a pneumatic central clutch release having a release piston which is coaxially arranged around a hollow shaft and is mounted so as to be movable in the direction of an axis of the hollow shaft, a housing which at least partially surrounds the release piston so as to form a pressure chamber between the hollow shaft, the housing, and the release piston, wherein the pressure chamber is sealed from an environment and is connectable to a fluid pressure source, and a cleaning chamber which is fluidically arranged between the pressure chamber and the environment and is connectable to the environment via a purge channel,
the method comprising the steps of:
pressurizing the pressure chamber by a fluid under positive pressure so that the release piston disengages;
reducing the volume of the cleaning chamber by the disengaging release piston; and
draining fluid under positive pressure from the cleaning chamber into the environment via the purge channel, wherein
a cross-section of the purge channel is configured such that a fluid present inside the cleaning chamber and under positive pressure relative to the environment diffuses into the environment.

13. The self-cleaning method according to claim 12, wherein the fluid pressure inside the cleaning chamber remains above the fluid pressure of the environment for a minimum period of time from a respective first movement until a respective next movement of the release piston.

14. A self-cleaning method for an engaged pneumatic central clutch release having a release piston which is coaxially arranged around a hollow shaft and is mounted so as to be movable in the direction of an axis of the hollow shaft, a housing which at least partially surrounds the release piston so as to form a pressure chamber between the hollow shaft, the housing, and the release piston, wherein the pressure chamber is sealed from an environment and is connectable to a fluid pressure source, and a cleaning chamber which is fluidically arranged between the pressure chamber and the environment and is connectable to the environment via a purge channel,
the method comprising the steps of:
draining fluid under positive pressure from the pressure chamber into the cleaning chamber;
engaging the release piston by a falling fluid pressure in the pressure chamber; and
draining fluid under positive pressure from the cleaning chamber into the environment via the purge channel, wherein
a cross-section of the purge channel is configured such that a fluid present inside the cleaning chamber and under positive pressure relative to the environment diffuses into the environment.

15. The self-cleaning method according to claim 14, wherein the fluid pressure inside the cleaning chamber remains above the fluid pressure of the environment for a minimum period of time from a respective first movement until a respective next movement of the release piston.

* * * * *